Nov. 14, 1961  C. BOSCH ET AL  3,009,148
AUDIO-VISUAL R.D.F. ADAPTER
Filed July 20, 1959
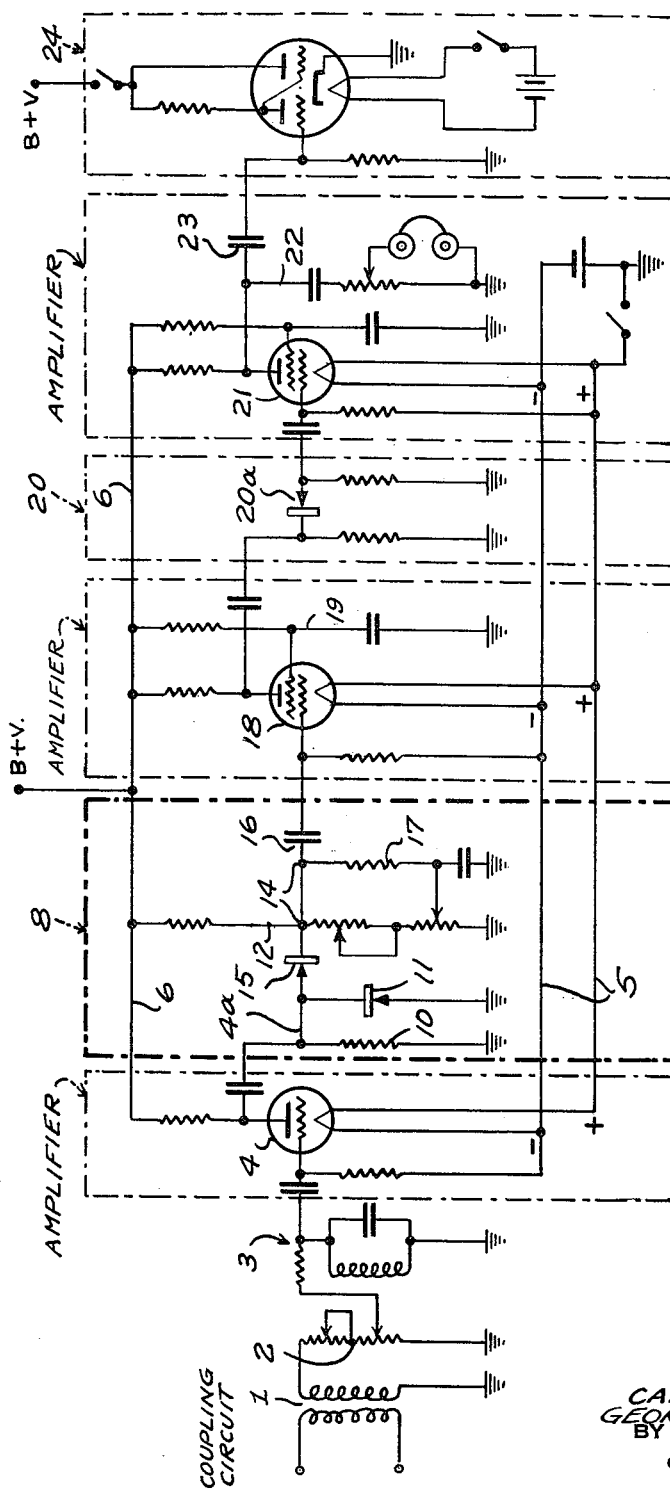
INVENTORS
CARL BOSCH
GEORGE W. GRIMM
BY
Borst & Borst
ATTORNEYS

3,009,148
AUDIO-VISUAL R.D.F. ADAPTER

Carl Bosch, Larchmont, and George W. Grimm, New York, N.Y., assignors to Sperry Rand Corporation, Ford Instrument Company Division, Wilmington, Del., a corporation of Delaware
Filed July 20, 1959, Ser. No. 828,411
3 Claims. (Cl. 343—113)

This invention relates to adapter circuits for radio direction finders which are employed to process the incoming beacon signals for aural or visual identification.

Radio beacon signals are conventionally detected by loop type direction finders which are employed to take the bearing of the signals by being turned to the null position. Since the signal received at the null point is zero, the inherent signal to noise ratio of this method of bearing taking is also zero which can result in considerable inaccuracy. The instant arrangement circuit is adapted to use maximum signal level or critical levels between zero and maximum to determine the bearing of the signal beacon. When intermediate amplitudes are employed two bearings are taken which occur at equal angles with the line of sight to the beacon and which, therefore, result in equal signal levels.

The radio beacon signals are usually modulated by a 1000 cycle note which is pulsed on and off one or more times a second to produce a dot-dash code which identifies the beacon. In the adapter the 1000 cycle signal from the radio direction finding receiver is fed to a step up transformer. The output of the audio transformer feeds an LC circuit which is sharply turned to 1000 cycles. The high Q of this circuit reduces the acceptable audio bandwidth to a relatively narrow channel and thereby eliminates a large part of the noise and increases the signal to noise ratio.

The signal developed across the turned circuit is amplified, resulting in a rectangular output envelope which corresponds to the pulse code of the beacon. This signal is then applied to a diode clipping circuit so that an output voltage is obtained only when the signal voltage reaches or exceeds a preset minimum. The output of this circuit is amplified and applied to a "tuning eye" indicator. The amplified signal is also available at a set of earphone output terminals.

The signal developed across the tuned circuit and amplifier mentioned above contains some residual noise so that if the signal is slowly increased to the clipping voltage, the output of the clipper is basically the "noise" part of the signal and appears as a disturbance on the tuning eye as this critical point is reached. Thus as the loop of the direction finder is slowly turned from zero toward maximum, a precise point will be reached where this disturbance is first observed. By locating two such points on either side of the line of sight to the beacon a precise reading of the bearing is obtained.

There follows a detailed description of one embodiment of the circuit arrangement for the RDF adapter which is taken in conjunction with the drawing illustrating its circuitry.

Referring to the drawing, the signal from the radio direction finder is impressed on step up transformer 1 which is coupled by a voltage dividing network 2 to a filter circuit 3 which is tuned exactly to the signal frequency, say 1000 cycles. Its inductor is wound on a high permeability molybdenum Permalloy powder toroid which results in high Q. This circuit passes only a narrow band of frequencies near 1000 cycles and enhances the signal to noise ratio thereby making the system usable with weak stations, noisy signals or at greater distance than is normally of use in conventional systems. The filter output is placed on the grid of amplifier tube 4 the filament of which is battery excited to reduce hum and is connected to battery line 5. The plate of the tube 4 is supplied by the B+ line 6.

Diode clipping circuit 8 is connected to the output side of the tube 4 and serves to prevent the signal from passing to succeeding circuit components unless its amplitude reaches or exceeds a preselected level. To this end, the circuit includes a ground resistor 10 and shunting diode rectifier 11 connected into the output lead 4$^a$ of the tube 4, the rectifier being poled thereto, a grounded reference voltage line 12 connected to the lead 6, and to the amplifier output lead 4$^a$ by means of a tap connection 14 and a second diode rectifier 15 disposed in the lead 4$^a$ between the diode rectifier 11 and tap connection 14. The circuit is arranged so that the signal is clamped by the diode rectifier 11 and may not go below ground potential since in that event signal aiding current would be caused to flow across the rectifier. The second diode is then enabled to apply a continuous peak to peak signal to capacitor 16 through a low value resistor 17 when the signal exceeds the reference voltage established by the resistors in the reference voltage line 12.

An amplifier tube 18 connected between the line 6 and the filament excitation line 5 receives the signal on its control grid, its screen grid being also supplied by the line 6 by means of resistor-capacitor line 19.

In the clipping circuit described above, the reverse current of the diodes is not zero as would be the case for an ideal diode. This causes a small signal to appear at the grid of the amplifier 18 when the input signal is below the reference level previously described. After passing thru this amplifier tube this "leakage" signal is of the order of a tenth volt or so. A diode network 20 having a diode rectifier 20$^a$ which is disposed in the output lead of the tube 18 and poled thereto stops this signal by virtue of the fact that approximately .6 volt is necessary for conduction in the forward direction to occur. Thus only signals which are larger than a small increment above the reference level in the clipping circuit arrive in the third amplification stage, below described.

A third stage of amplification is provided by the tube 21 which is connected between the filament excitation line 5 and the supply line 6. This amplifier circuit causes the excess of signal over reference level to be magnified so that the output of this stage is large when the signal to the diode clipping circuit exceeds the reference level by only a small amount.

The signal from the amplifier 21 may be observed with any kind of voltage sensitive device such as an A.C. voltmeter. This signal consists of the peaks of the original 1000 cycle input signal plus a small fraction of the original noise. Aural indication is avalable by making use of the tapping connections on capacitor-resistor lead 22 which is connected across the plate output lead 23. Visual indication is provided by the so-called "tuning eye" or "magic eye" indicator 24 comprising a dual triode with one of the grids also connected across the output of the amplifier 21. "Tuning eye" indicators are described in RCA Receiving Tube Manual Technical Series RC15 and as explained therein have an illuminated fluorescent screen.

The visual type indicator 6AB5 ("tuning eye" or "magic eye") was chosen because it contains an illuminated fluorescent screen. With no signal input this screen shows a 90° shadow area. When the signal is applied the angle of the shadow decreases from 90° to 0° at full signal strength. Thus the character of the signal including noise can be partially inferred by the disturbance caused in the shadow and gives the operator a more sensitive indication than would be provided by the pointer of a voltmeter, for example. Thus the operator may select portions of the region from 90° shadow angle to 0° shadow angle since he is in a rough way observing the signal on the screen. This enhances the overall accuracy of the system without the insertion of additional stages of amplification.

It is understood that modifications in circuit design may be effected by persons skilled in the art without departing from the scope and principle of invention as defined in the appended claims.

What is claimed is:

1. A radio direction finder adapter comprising a signal coupling device, a frequency filter connected to said device, a clipping circuit disposed in the output of said filter and adapted to block signals below a prescribed amplitude level and a signal bearing indicator connected to the output of said circuit, said indicator being adapted to respond to signals above said prescribed amplitude level proportionately according to the strength of said signals.

2. A radio direction finder adapter comprising a signal coupling transformer, a frequency filter connected to said device and adapted to be sharply tuned to said signal, a clipping circuit disposed in the output of said filter and adapted to block signals below a preselected amplitude level, an amplifier in the output of said circuit and a signal bearing indicator connected to the output of said amplifier, said indicator being adapted to respond to signals above said prescribed amplitude level proportionately according to the strength of said signals.

3. A radio direction finder adapter comprising a signal coupling transformer, a frequency filter connected to said device and adapted to be sharply tuned to said signal, a clipping circuit disposed in the output of said filter and adapted to block signals below a preselected amplitude level, an amplifier in the output of said circuit, an indicator connected to the output of said amplifier and means for preventing leakage currents emanating from said clipping circuit from reaching said indicator.

References Cited in the file of this patent

UNITED STATES PATENTS

| | | |
|---|---|---|
| 2,417,310 | Luck | Mar. 11, 1947 |
| 2,458,310 | Sontheimer | Jan. 4, 1949 |

OTHER REFERENCES

Electrical communication, vol. 25, No. 2, June 1948, pp. 136–137.